(12) United States Patent
Esser et al.

(10) Patent No.: US 8,430,410 B2
(45) Date of Patent: Apr. 30, 2013

(54) PISTON RING

(75) Inventors: Johannes Esser, Odenthal (DE); Frank Münchow, Wermelskirchen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 243 days.

(21) Appl. No.: 12/527,115

(22) PCT Filed: Jan. 30, 2008

(86) PCT No.: PCT/DE2008/000164
§ 371 (c)(1),
(2), (4) Date: Aug. 13, 2009

(87) PCT Pub. No.: WO2008/098548
PCT Pub. Date: Aug. 21, 2008

(65) Prior Publication Data
US 2010/0066031 A1    Mar. 18, 2010

(30) Foreign Application Priority Data
Feb. 17, 2007   (DE) .......................... 10 2007 007 963

(51) Int. Cl.
*F16J 9/26*    (2006.01)

(52) U.S. Cl.
USPC ........................................... 277/442; 277/440

(58) Field of Classification Search ................... 277/440, 277/442–444
See application file for complete search history.

(56) References Cited

U.S. PATENT DOCUMENTS
4,214,762 A    7/1980    Mayhew et al.

FOREIGN PATENT DOCUMENTS
| | | |
|---|---|---|
| DE | 4005200 A1 | 8/1991 |
| DE | 60302321 | 6/2006 |
| EP | 0905420 A | 3/1999 |
| EP | 1460318 A | 9/2004 |
| GB | 2129091 | 5/1984 |
| WO | WO2005/121609 A1 | 12/2005 |

*Primary Examiner* — Gilbert Lee
(74) *Attorney, Agent, or Firm* — Robert L. Stearns; Dickinson Wright, PLLC

(57) ABSTRACT

A piston ring, with a main body, which exhibits a contact surface, an upper and a lower side surface, and an inner circumferential surface, in which at least one of the side surfaces is provided at least with one PVD coating layer, to the effect that the layer thickness of the PVD coating layer tapers radially from the outside inward.

13 Claims, 1 Drawing Sheet

PISTON RING

BACKGROUND OF THE INVENTION

1. Technical Field

Figure 1:
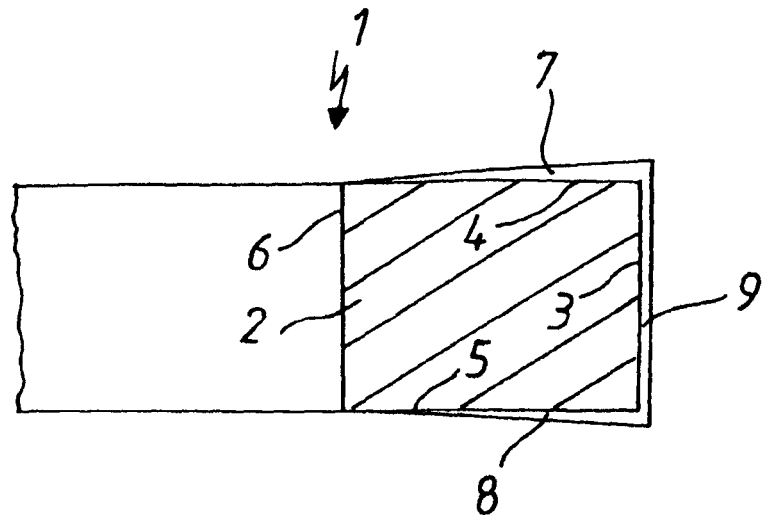

The invention concerns a piston ring, with a main body, which exhibits a contact surface, an upper and a lower side surface, and an inner circumferential surface.

2. Related Art

In EP 1 460 318 A1, a piston-ring coating is described, in which at least the lower side surface is coated with a special polymer.

Piston rings execute radial and axial motions in the groove of the piston. These motions cause, among other things, wear on the sides of the ring. Under normal loads, this wear can be counteracted by means of a suitable choice of material for the piston ring. In modern combustion engines, the stress on the ring increases more and more due to higher and higher output, so that exclusive protection of a particular side can no longer be guaranteed via the base material. In this case, an isolated wear-protection layer on the side is needed. A special problem is represented by so-called microwelding as a special type of wear on the sides of piston rings. This phenomenon frequently occurs in Otto reciprocating internal-combustion engines when steel rings are used.

Known procedures which counter ring-side wear are the nitriding of the ring side(s) of steel rings or the thin chroming of the sides, in which nitriding, as has already been stated, is not suitable when microwelding occurs. However, in order to be able to further retain nitrided steel rings to advantage, special protective measures must be considered.

SUMMARY OF THE INVENTION

The invention is based on the problem of preparing a coating for the ring sides of piston rings, which on the one hand offers protection against macroscopic wear and on the other hand counteracts microwelding. In addition, the coating should exhibit good compatibility with the piston material, or rather to the ring carrier introduced.

This problem is solved by means of a piston ring with a main body, which exhibits a contact surface, an upper and a lower side surface, and an inner circumferential surface, whereby at least one of the side surfaces is provided with at least one physical-vapor-deposition (PVD) coating layer, to the effect that the layer thickness of the PVD coating layer tapers radially from the outside inward.

The subject matter of the invention is usable both for piston rings formed with a rectangular cross-section and for those with single- or double-sided trapezoidal sections.

Physical-vapor-deposition (PVD) coating is a process in which the coating of the contact surface of the piston ring occurs by means of deposition from the vapor phase. The coating material being deposited exists, at the same time, as a stream of ionized particles.

As coatings, chromium-based nitride layers are coming to be preferred for use as a requirement for wear protection, such as, for example, CrN or CrON layers. Further developments in the form of many-layered or multilayered layers are however also suitable as PVD coating layers.

Depending on the use and cross-section of the piston ring, in considering technical engine requirements, either just the lower side surface or both side surfaces are provided with a PVD coating layer.

Furthermore, the possibility exists that the PVD layer is formed on a base of a nitride of elements in groups IV B to VI B of the periodic table. This can occur optionally with or without the addition of the elements Al, Si, C, or O.

It is especially advantageous that a wear-protection layer applied by the PVD procedure is formed, to the effect that it exhibits in the vicinity of the outside diameter a thickness of between 8 and 20 μm, and that the layer thickness for the inside diameter is continuously reduced, whereby a thickness there is in the range between 2 and 10 μm. By means of these measures, an often observed wear picture is overcome for piston rings in the vicinity of the ring outside diameter.

Especially advantageous are so-called PVD-DLC (diamond-like carbon) coatings, which are applied to the side surface(s) of piston rings. They form especially wear-resistant surfaces with a low coefficient of friction. DLC layers exhibit in addition good adhesion to the main body and a high rupture strength.

A further idea according to the invention, if additional protection is needed against microwelding in nitrided steel rings, is the application of a PVD-DLC coating, which can, if necessary, be made even thinner than the PVD coating mentioned.

It is of particular significance that a side coating has to be producible economically, which means that no further mechanical working may be done to the coated side. Since PVD coatings are very thin and deposited symmetrically, the coating satisfies this criterion in this way.

THE DRAWINGS

Figure 2:
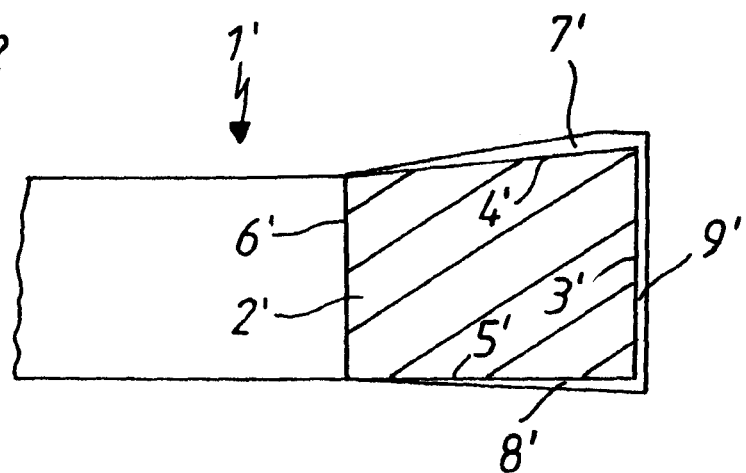
Figure 3:
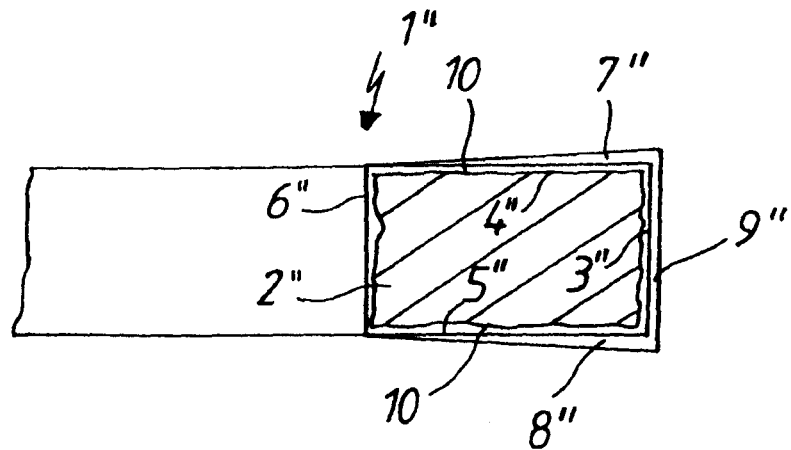

The subject matter of the invention is represented with the aid of one embodiment in the drawing and is described as follows. Shown are:

FIG. 1 A piston ring with rectangular cross-section, which is provided at least in the area of its sides with a wear-protection layer;

FIG. 2 A one-sided trapezoidally shaped piston ring, which is provided at least in the area of its dies with a wear-protection layer; and FIG. 3 A variant of FIG. 1, in which the sides are provided with another type of wear-protection layer.

DETAILED DESCRIPTION

FIG. 1 shows a piston ring 1, which exhibits a main body 2 with a rectangular cross-section. The piston ring 1 involves a contact surface 3, an upper 4 and a lower side surface 5, and an inner circumferential surface 6. The upper 4 and the lower side surfaces 5 in this example are each provided with a PVD coating layer 7,8, which is formed in this example on a base of CrN. Depending on the specifications, it may be sufficient in certain cases, to provide only the critical lower side surface 5 or the upper side surface 4 with a corresponding PVD coating layer 8,7. The respective PVD coating layer 7,8 is hereby shaped so that it has its greatest layer thickness in the area of the contact surface 3, for example 15 μm, which is reduced continuously in the direction of the inner circumferential surface 6 to a layer thickness of 4 μm. By means of these steps, an often observed wear picture is counteracted, since increased side wear often occurs in the area of the outer circumferential surface of the piston ring 1. The contact surface 3 can, if necessary, also be coated with a PVD coating layer 9 in a similar or other embodiment. Also conceivable are PVD coating layers based on CrON. The professional expert will predetermine a suitable material combination as well as the layer thickness, depending on the application.

FIG. 2 shows an alternative to FIG. 1. A piston ring 1' is represented with a main body 2', which is formed in this example in trapezoidal shape in the area of its upper side surface 4', whereas the lower side surface 5' runs linearly. By analogy with FIG. 1, in the area of both side surfaces 4',5', PVD coating layers 7',8' are deposited, for example based on CrON, in which a tapering of the respective PVD coating layer 7',8', going out from the contact surface 3' as far as the inner circumferential surface 6' is present here as well. The contact surface 3' can also be provided with a PVD coating layer 9'.

FIG. 3 shows a further alternative to FIG. 1. The piston ring 1" represented here once more exhibits a rectangular main body 2". In this example, the entire ring cross-section of the main body 2" is provided with a wear-protection layer formed as a nitrided layer 10 with a layer thickness of 20 μm. On this nitrided layer 10, by analogy with FIGS. 1 and 2, a PVD coating layer 7",8" is deposited, which tapers in layer thickness going continuously out from the contact surface 3" as far as the inner circumferential surface 6". A PVD coating layer 9" can also be provided on the contact surface 3".

The invention claimed is:

1. A piston ring, with a one-piece main body exhibiting an outer circumferential contact surface, an upper-most side surface, a lower-most side surface, and an inner circumferential surface, wherein said one-piece main body has a convex shape as viewed in cross-section, wherein the outer circumferential contact surface and at least one of the upper-most and lower-most side surfaces is provided with at least one physical-vapor-deposition (PVD) coating layer, to the effect that the outer-most portion of the PVD coating layer has a thickness that is greater than the thickness of the main body at the outer circumferential contact surface, and wherein the PVD coating layer tapers radially from the outside inward substantially all the way to the inner circumferential surface of the main body.

2. A piston ring according to claim 1, wherein at least the lower side surface is provided with a wear-protection layer produced by nitriding, on which the PVD coating layer is deposited.

3. A piston ring according to claim 2, wherein the wear-protection layer exhibits a layer thickness of 5 to 50 μm.

4. A piston ring according to claim 3, wherein the PVD coating layer exhibits a layer thickness of 0.5 to 20 μm.

5. A piston ring according to claim 1, wherein the PVD coating layer is formed on a base of CrN and/or CrON.

6. A piston ring according to claim 1, wherein the PVD coating layer is on a base of nitrides of elements in groups IV B to VI B of the periodic table.

7. A piston ring according to claim 6, including addition of at least one element to the base of nitride elements selected from the group consisting of Al, Si, C and O.

8. A piston ring according to claim 1, wherein the PVD coating layer is formed as a friction- and wear-resistant PVD-DLC (diamond-like carbon) layer.

9. A piston ring according to claim 8, wherein at least one of the side surfaces of the main body with at least a one-sided trapezoidal shape tapers from the outside inward, and that at least the PVD coating layer is deposited on this side surface.

10. The piston ring according to claim 9 wherein the PVD coating layer is a PVD-DLC layer.

11. A piston ring according to claim 1, wherein the PVD coating layer in the vicinity of the contact surface is about 3 to 20 μm and is reduced in the direction of the inner circumferential surface to 1 to 10 μm.

12. A piston ring according to claim 1, wherein the main body is formed trapezoidally on both sides in cross-section and at least one of the side surfaces is provided at least with the PVD coating layer.

13. The piston ring according to claim 12 wherein the PVD coating layer is a PVD-DLC layer.

\* \* \* \* \*